June 5, 1923. 1,457,561
B. E. TAYLOR
COUPLING CONNECTION AND NONCORROSIVE COATING THEREFOR
Filed Dec. 5, 1919 2 Sheets-Sheet 2

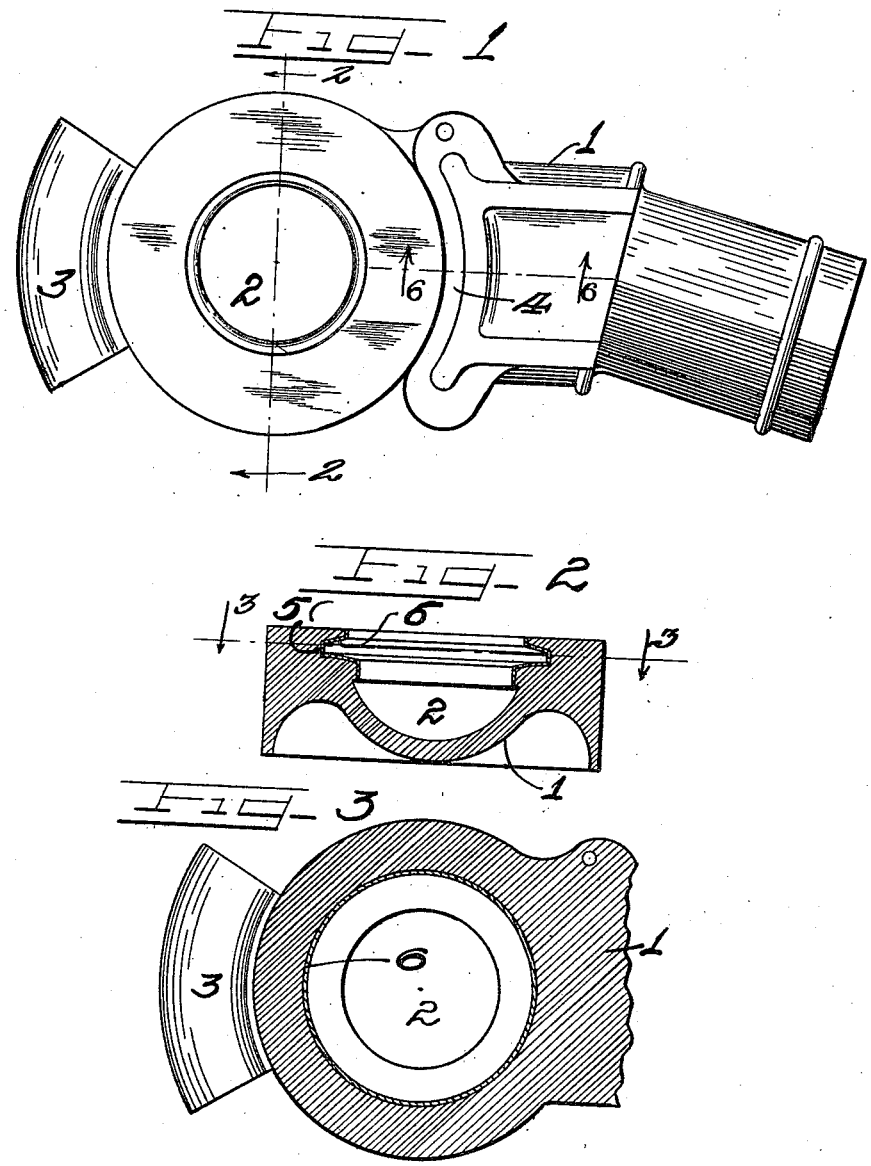

Witnesses
Inventor
Bayard E. Taylor

Patented June 5, 1923.

1,457,561

UNITED STATES PATENT OFFICE.

BAYARD E. TAYLOR, OF CHICAGO, ILLINOIS.

COUPLING CONNECTION AND NONCORROSIVE COATING THEREFOR.

Application filed December 5, 1919. Serial No. 342,705.

*To all whom it may concern:*

Be it known that I, BAYARD E. TAYLOR, a citizen of the United States, and a resident of the city of Chicago, in the county of Cook and State of Illinois, have invented certain new and useful Improvements in a Coupling Connection and Noncorrosive Coating Therefor; and I do hereby declare that the following is a full, clear, and exact description of the same, reference being had to the accompanying drawings, and to the numerals of reference marked thereon, which form a part of this specification.

Steam and air couplings which are generally used in railroad equipment, have not proved durable and efficient for any length of time, owing to leakage occurring after a very short period of use. The leakage is attributed to the fact that the metal upon which the sealing gaskets are seated, becomes corroded so that the gasket does not seat tightly thereto; and particularly where rubber gaskets are used, moisture finding its way between the gasket and the metal, sets up a corrosive action due to the sulphur present in the gasket from its vulcanization.

Many experiments have been made with couplings of different construction to guard against this objection. Metal inserts recessed into the coupling, alloyed therewith or affixed thereto in any manner, have been used and while in some instances proving somewhat successful, have not been practical from an economical point. This invention contemplates the treating of that portion of the metal in which the gasket is seated to plate or cover the same with metal which is non-corrosive and has no electrolytic action with the metal of the coupling. Any process may be used for the treatment of the coupling, such as galvanizing, tinning or other means.

It is an object, therefore, of this invention to provide a coupling recessed to receive a sealing gasket, and having a coating of non-corrosive and non-electrolytic metal, upon which the gasket is seated, and which presents a mirror-like surface, which with the gasket provides an efficient seal under high pressures.

It is also an object of this invention to provide a coupling with that portion of the coupling coated with a non-corrosive, durable metal to receive the gasket seated thereagainst and further, with the locking parts of the coupling, which co-act with complemental parts of another coupling section treated by a surface hardening process to reduce wear, so that the coupling sections always lock and seal tightly and are not impaired by long and hard usage.

Other and further important objects of this invention will be apparent from the disclosures in the drawings and specifications.

The invention (in a preferred form) is illustrated in the drawings and hereinafter more fully described.

*Drawings.*

Figure 1, is an interior face view of a coupling section constructed according to the principles of my invention.

Figure 2, is a detail section on line 2—2 of Figure 1.

Figure 3, is a detail section on line 3—3 on Figure 2.

*Description.*

Figure 4:
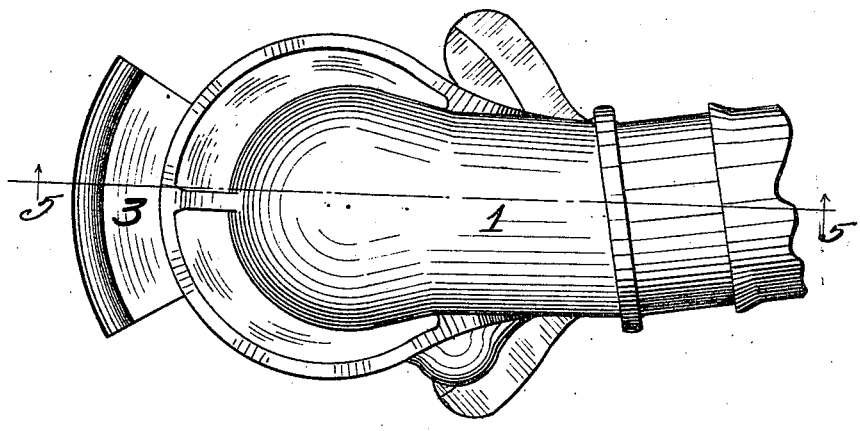
Figure 4, is an exterior reversed view of the coupling shown in Figure 1.
Figure 5:
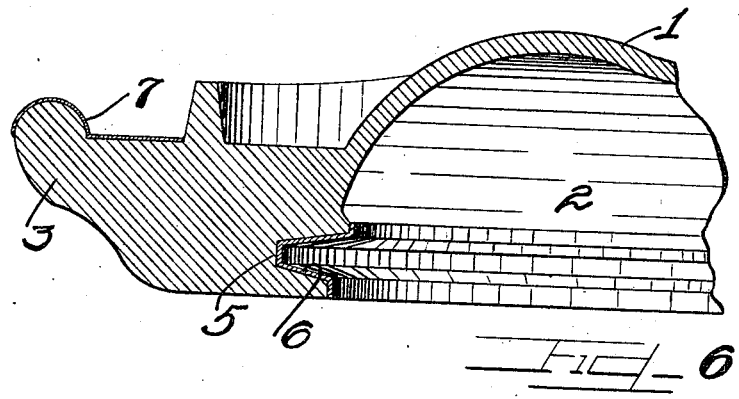
Figure 5, is a fragmentary detail section on line 5—5 of Figure 4.
Figure 6:
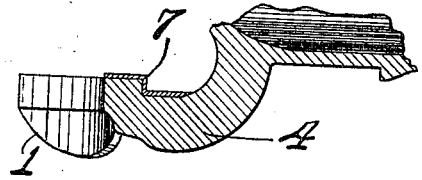
Figure 6, is an enlarged detail section on line 6—6 of Figure 1.

The housing of the coupling section is denoted as a whole by the reference numeral 1, and is cored out on its interior as indicated by the reference numeral 2, to permit the passage of fluid therethrough. A segment shaped interlocking flange 3, is provided on the outer end of the housing, for co-action with a segment shaped recessed portion 4, of a complemental coupling section which is formed integrally on the portion of the housing. The coupling section is provided with an interior groove 5, adapted ordinarily to receive a sealing gasket seated therein, which extends outwardly from the face of the coupling section and is adapted to seal against a similar gasket on a complemental coupling section.

Heretofore corrosion of the metal in the groove in which the gasket has been seated has taken place, not only rotting the gasket, but also causing leakage. I overcome this difficulty in an economical and easy manner by applying a coating 6, of non-corrosive metal to said groove or recessed portion of the housing, which is then polished to a mirror-like surface and has no tendency to set up an electrolytic action with the metal of the housing.

The smooth mirror-like surface also prevents the leakage or deposition of any water behind the gasket on account of the accurate fit obtained in this manner between the gasket and the perfectly smooth surface. Furthermore, owing to the fact that it is applied to the surface of the metal of the housing and adheres thereto as though a part thereof, extreme temperature changes can have no effect thereon as in instances where metal inserts have been used, having different co-efficients of expansion and contraction than those of the metal of the housing itself.

Furthermore, the wearing parts of the coupling, which have become worn, are apt to permit leakage between the pair of complemental coupling sections as the segment flanges 3, and the segment shaped recess 4, do not lock tightly. I overcome this difficulty by treating the flanges 3 and the recesses 4 by a surface hardening process, so that an extremely hard, durable and non-wearing surface 7 is provided on the interlocking members of the coupling.

Couplings made in accordance with the disclosure in the foregoing, have proved extremely successful in use and very economical to manufacture. I lay no claim to the process used, but I do claim broadly the idea of applying a process treatment to certain portions of a coupling section to attain the results desired.

I am aware that numerous details of construction may be varied through a wide range without departing from the principles of this invention, and I therefore do not purpose limiting the patent granted otherwise than necessitated by the prior art.

*Claims.*

1. A coupling section having a gasket receiving groove, and a corrosion resisting metallic coating applied directly to the walls of said groove.

2. A coupling section having a gasket receiving groove, and a corrosion resisting metallic coating applied directly to the walls of said groove, said coating being of a metal that will not act electrolytically with the metal of the coupling.

3. In a coupling of the class described, a seat for a gasket, and a highly-polished thin coating on said seat forming an immovable air and fluid tight construction.

4. A coupling section having a gasket receiving groove, and a highly polished corrosion-resisting metallic coating permanently combined with the walls of said groove.

5. A coupling section having a gasket receiving groove, and a highly polished metallic coating permanently combined with the walls of said groove, said coating being of a metal that will not react electrolytically with the metal of the coupling.

In testimony whereof I have hereunto subscribed my name in the presence of two subscribing witnesses.

BAYARD E. TAYLOR.

Witnesses:
CHARLES W. HILLS, Jr.,
EARL M. HARDINE.